(12) United States Patent
Liu et al.

(10) Patent No.: US 6,965,510 B1
(45) Date of Patent: Nov. 15, 2005

(54) SINTERED VALVE METAL POWDERS FOR IMPLANTABLE CAPACITORS

(75) Inventors: Yanming Liu, Clarence Center, NY (US); David Goad, Orchard Park, NY (US); Barry Muffoletto, Alden, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 2 days.

(21) Appl. No.: 11/010,676

(22) Filed: Dec. 13, 2004

Related U.S. Application Data

(60) Provisional application No. 60/528,917, filed on Dec. 11, 2003.

(51) Int. Cl.[7] ............................ H01G 9/042; H01G 9/04

(52) U.S. Cl. ....................... 361/529; 29/25.03; 361/532

(58) Field of Search .................... 361/503, 508–509, 361/523–824; 29/25.03

(56) References Cited

U.S. PATENT DOCUMENTS

| | | | |
|---|---|---|---|
| 3,825,802 A * | 7/1974 | Kumagai et al. ............ 361/529 |
| 4,186,367 A | 1/1980 | Chakrabarty et al. |
| 4,859,239 A | 8/1989 | Passmore |
| 5,456,878 A | 10/1995 | Tadokoro et al. |
| 5,982,609 A * | 11/1999 | Evans .......................... 361/516 |
| 6,215,652 B1 | 4/2001 | Yoshida et al. |
| 6,350,406 B1 | 2/2002 | Satou et al. |
| 6,375,704 B1 | 4/2002 | Habecker et al. |
| 6,420,043 B1 * | 7/2002 | Fife et al. .................... 428/472 |
| 6,462,934 B2 | 10/2002 | Kimmel et al. |
| 6,554,884 B1 * | 4/2003 | Tripp et al. .................... 75/252 |
| 2002/0069724 A1 * | 6/2002 | Fife et al. .................... 428/472 |
| 2003/0104923 A1 * | 6/2003 | Omori et al. ................ 501/134 |
| 2004/0089100 A1 * | 5/2004 | Fife ............................. 75/244 |

* cited by examiner

Primary Examiner—Eric W. Thomas
(74) Attorney, Agent, or Firm—Michael F. Scalise

(57) ABSTRACT

A sintering method for valve metal powders, such as tantalum, niobium, aluminum, titanium, and their alloys, is described. The valve metal powders are pressed into a pellet and sintered at a relatively high temperature, but for a relatively short time. The anodized valve metal structure is then useful as an anode in an electrolytic capacitor.

13 Claims, 2 Drawing Sheets

SINTERED VALVE METAL POWDERS FOR IMPLANTABLE CAPACITORS

CROSS-REFERENCE TO RELATED APPLICATION

This application claims priority from provisional application Ser. No. 60/528,917, filed Dec. 11, 2003.

BACKGROUND OF THE INVENTION

1. Field of the Invention

This invention generally relates to sintering of a valve metal powder for use as an anode in an electrolytic or an electrochemical/electrolytic hybrid capacitor. Suitable valve metals include, but are not limited to, tantalum, niobium, aluminum, titanium, and their alloys.

2. Prior Art

An electrolytic or an electrochemical/electrolytic hybrid capacitor can comprise a sintered porous anode body of valve metal such as tantalum or aluminum. Conventionally, the sintering process begins by molding a powder of the valve metal under pressure to form a molded piece or pellet having a desired shape. An anode lead wire of the valve metal is first imbedded into the powder before it is molded into the shaped pellet. The wire can also be welded to the pellet. The molded pellet with extending lead wire is then sintered in a furnace under a vacuum ranging from about $10^{-5}$ to about $10^{-6}$ Torr. Conventional sintering temperatures range from about 1,500° C. to about 1,800° C., and generally for as long as 30 minutes.

The problem is that when the pellet of a pressed valve metal powder is subjected to these temperatures for extended periods of up to 30 minutes, the real surface area and porosity of the anode are reduced. This, in turn, reduces anode volumetric capacitance and energy density. It also detrimentally affects the pellet's permeability, which means that powder particles deeper in the pellet are not readily available for the production of a dielectric oxide film thereon. This adversely increases capacitor ESR and decreases volumetric capacitance and energy density.

SUMMARY OF THE INVENTION

In general, an electrochemical/electrolytic hybrid or an electrolytic capacitor consists of an anode and a cathode that are separated from each other by an ionically conductive electrolyte or a porous separator material impregnated with the working electrolyte. The anode is of a valve metal, such as aluminum, tantalum, niobium, or titanium, in the form of a sintered pressed powder pellet. The valve metal anode is coated with a film of the corresponding oxide serving as a dielectric. Anodizing the valve metal in an appropriate electrolyte forms the dielectric oxide with the oxide film thickness increasing according to the capacitor working voltage. The final anodizing voltage determines the anodic film thickness.

Prior to being anodized in the electrolyte, the valve metal pellet is subjected to a relatively high sintering temperature for a relatively short period of time according to the present invention. The high temperature accomplishes the goal of sintering the pressed valve metal into a coherent body while the relatively short time at peak temperature does not adversely affect the volumetric energy density of the sintered pellet.

These and other aspects of the present invention will become more apparent to those skilled in the art by reference to the following description and to the appended drawings.

DETAILED DESCRIPTION OF THE PREFERRED EMBODIMENTS

Figure 1:
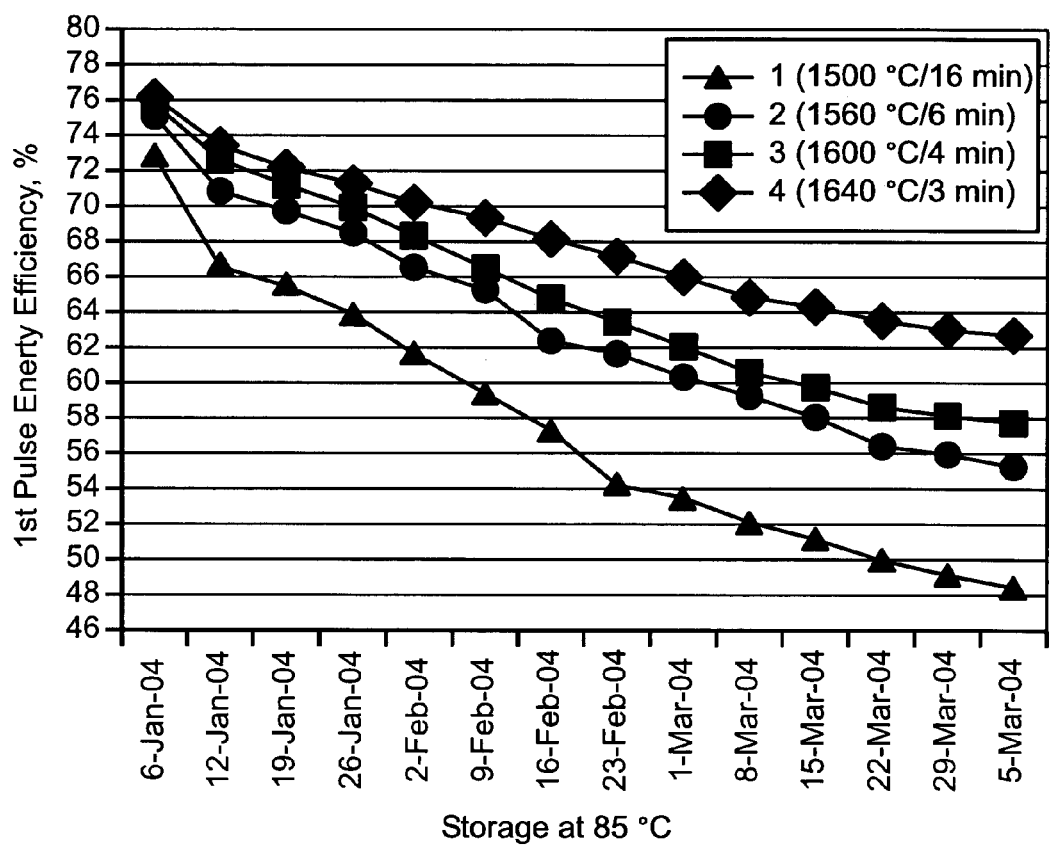
FIG. 1 is a graph of the $1^{st}$ charge/discharge pulse energy efficiency (E %) at 37° C. versus storage time at 85° C. for various tantalum pellets sintered according to the present invention in comparison to a conventionally sintered pellet.

Sintered valve metal powder bodies, such as pressed tantalum powder pellets, are commonly used as the anode for both electrolytic and electrochemical/electrolytic hybrid capacitors. In that respect, sintering conditions are crucial for anode electrical properties and capacitor performance. Normally, increasing sintering temperature and time reduces anode DC leakage and improves capacitor thermal stability. However, a higher sintering temperature also tends to increase capacitor ESR and decrease volumetric capacitance and energy density. These are undesirable consequences of high temperature sintering for a relatively longer period of time.

The present invention teaches methods of sintering valve metal powders to reduce DC leakage, increase energy efficiency, and improve anode long-term stability while maintaining low capacitor ESR and high energy density. In this invention, the valve metal powder is molded in a conventional manner under pressure to form a pellet having a desired shape. A lead wire is either imbedded in the powder before pressing or is welded to the subsequent pellet. For either an electrolytic or a hybrid capacitor, the tantalum anode is preferably in the form of a pressed/sintered tantalum powder pellet. Beam melt, sodium reduction, or other processes produce the tantalum powders. Exemplary beam melt and sodium reduced tantalum powders are available from H.C. Starck Inc., Newton, Mass. under the "QR" and "NH" family designations, respectively.

Regardless the tantalum type, the molded pellet with extending lead wire is then sintered in a furnace under a vacuum ranging from about $10^{-4}$ to about $10^{-6}$ Torr. Preferably, the valve metal pellet is of tantalum and sintering temperatures are from about 1,500° C. to about 1,800° C., which is a tighter range than in conventional practice. The pellet is held at the peak temperature for a relatively short period of time up to about 10 minutes. More preferably, the tantalum pellet is heated to a peak temperature ranging from about 1,550° C. to about 1,650° C. for up to about 8 minutes. Most preferably, the tantalum pellet is sintered at a peak temperature ranging from about 1,590° C. to about 1,640° C. for up to about 6 minutes.

It is also contemplated by the scope of the present invention that the valve metal pellet is heated in the vacuum without being held at the peak temperature. This means that as soon as the peak temperature is reached, the oven immediately begins to cool to ambient. Also, the sintering furnace temperature may be ramped to the peak temperature and cooled to the ambient at a fixed or a varied rate, and in one or multiple steps.

The cathode for the capacitor can be the same or a different material as the anode. For example, aluminum electrolytic capacitors normally contain highly etched aluminum foils, with or without a thin layer of oxide, as the cathode. Electrochemical/electrolytic hybrid capacitors contain cathodes of a pseudocapacitive transition metal oxide, nitride, carbide or oxy-nitride, the transition metal being selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. Ruthenium oxide is a particularly preferred cathode material. The pseudocapacitive coating is deposited on a conductive substrate such as of titanium or tantalum.

A suitable separator material impregnated with a working electrolyte segregates the anode and cathode electrodes from each other. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR (DMS Solutech), a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). Cellulose based separators are also useful.

A suitable working electrolyte typically includes sulfuric acid in an aqueous solution. For example, a 38% sulfuric acid solution performs well at voltages up to about 125 volts. Other useful electrolytes are described in U.S. application Ser. No. 10/868,017, filed Jun. 16, 2004, now U.S. Patent Application Pub. No. 20050117276. This application is assigned to the assignee of the present invention and incorporated herein by reference. The electrolytes of this application are useful for capacitors having an operating range of about 175 volts to about 400 volts while maintaining high conductivity.

Valve metal anodes, and particularly those of tantalum, sintered according to the present invention exhibit lower DC leakage and improved energy efficiency and long-term stability without increasing capacitor ESR and decreasing volumetric capacitance and energy density in comparison to those subjected to conventional sintering techniques. This makes them particularly useful for capacitors designed into critical applications such as implantable cardioverter defibrillators in which low DC leakage and high and stable lifetime charge/discharge energy efficiency is strongly desired in order to minimize the device size and enhance performance reliability. Such capacitors are described in U.S. Pat. Nos. 5,894,403, 5,920,455, and 5,926,362, which are assigned to the assignee of the present invention and incorporated herein by reference.

The following examples describe the present invention, and they set forth the best mode contemplated by the inventors of carrying out the invention, but they are not to be construed as limiting.

EXAMPLE I

Five pressed powder tantalum pellets were sintered according to the varied conditions listed in Table 1. The pellets are designated as 1, 2, 3, 4 and 5 in the table. Pellet no. 1 was sintered at 1,500° C. for 16 minutes and served as the control. This is a relatively low temperature for a relatively long time. Pellets nos. 4 and 5 sintered at 1,640° C. for 3 and 4 minutes, respectively, had the lowest DC leakage (DCL) in units of nono-Amp/(microfarad×volt) (nA/CV), but they also had the lowest volumetric capacitance (AC capacity/cc) and energy density (J/cc). Pellet no. 3 sintered at 1,600° C. for 4 minutes exhibited lower DC leakage than the control pellet no. 1 while still maintaining a high volumetric capacitance and energy density.

TABLE 1

| Run # | Sintering | ACCap/cc | nA/CV | J/cc |
|---|---|---|---|---|
| 1 | 1500 C./16 min | 294.2 | 1.27 | 9.34 |
| 2 | 1560 C./6 min | 291.4 | 0.64 | 9.22 |
| 3 | 1600 C./4 min | 294.9 | 0.54 | 9.30 |
| 4 | 1640 C./3 min | 288.7 | 0.45 | 9.15 |
| 5 | 1640 C./4 min | 288.1 | 0.44 | 9.02 |

FIG. 1 is a graph of the $1^{st}$ charge/discharge pulse energy efficiency (E %) at 37° C. versus storage time at 85° C. for the various pellets listed in Table 1. The improvement in energy efficiency stability of the pellets sintered according to the present invention is demonstrated. It is particularly apparent in comparing the results for the prior art pellet no. 1 (triangles) in comparison to those of pellet no. 4 (diamonds). As shown in Table 1, the results for pellet nos. 4 and 5 are very similar.

EXAMPLE II

Twelve pressed powder tantalum pellets were divide into two groups. Group I contained five pellets sintered at 1,500° C. for 16 minutes and served as a control. Group II contained seven pellets sintered at 1,600° C. for 3 minutes. This is listed in Table 2.

TABLE 2

|  | Sintering (° C./min.) | Capacitance ($\mu$F/cc) | DCL ($\mu$A) | Energy (J/cc) |
|---|---|---|---|---|
| Group I | 1500/16 | 400 | 46.5 | 9.238 |
| Group II | 1600/3 | 397 | 38.9 | 9.17 |

Figure 2:
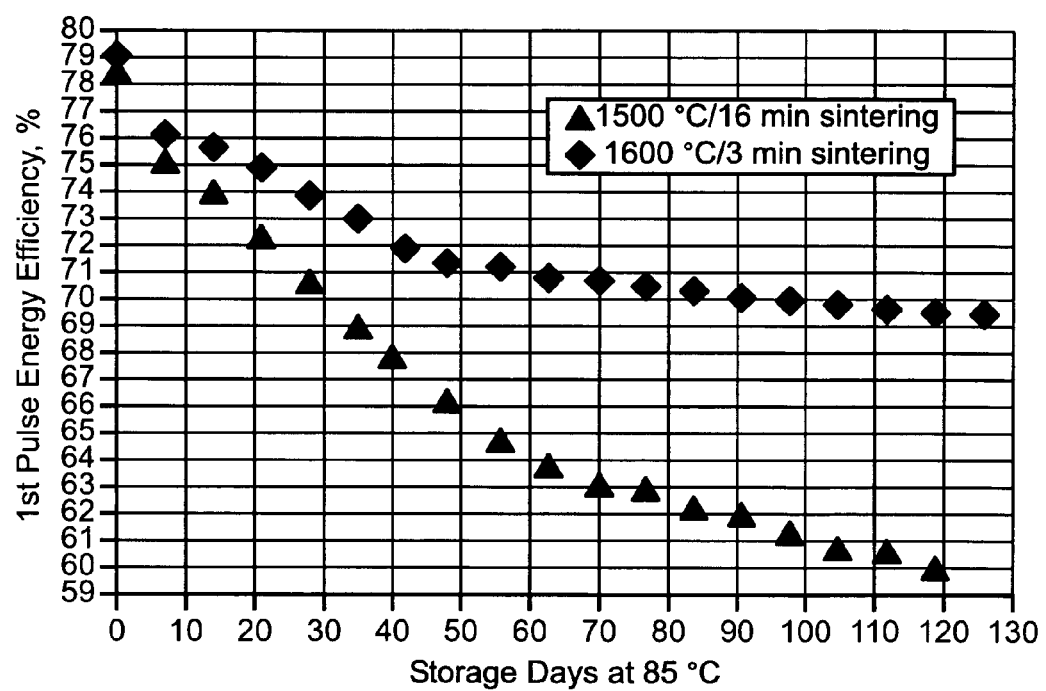
FIG. 2 is a graph of the $1^{st}$ cycle charge/discharge pulse energy efficiency at 37° C. versus storage time at 85° C. for a tantalum pellet sintered according to the present invention in comparison to a conventionally sintered pellet.

FIG. 2 is a graph of the average $1^{st}$ charge/discharge pulse energy efficiency (E %) at 37° C. versus storage time at 85° C. for the various pellets listed in Table 2. Again, the improvement in energy efficiency stability of the Group II pellets sintered according to the present invention is demonstrated.

Thus, an optimal sintering protocol for a given powder morphology and formation voltage is at a relatively higher temperature with a shorter sintering time than is used in conventional practice. This allows for improved long term performance stability while still maintaining a high volumetric capacitance and energy density.

It is appreciated that various modifications to the inventive concepts described herein may be apparent to those of ordinary skill in the art without departing from the scope of the present invention as defined by the appended claims.

What is claimed is:
1. An anode for a capacitor, the anode comprising:
 a) a tantalum powder provided in the form of a pressed body;
 b) wherein the tantalum body is characterized as having been heated to a sintering temperature of about 1,550° C. to about 1,650° C. for up to about 8 minutes.

2. The anode of claim 1 wherein the tantalum is characterized as having been heated to the sintering temperature of about 1,590° C. to about 1,640° C. for up to about 6 minutes.

3. The anode of claim 1 wherein the tantalum is characterized as having been heating to the sintering temperature in a vacuum ranging from about $10^{-4}$ to about $10^{-6}$ Torr.

4. A capacitor, which comprises:
   a) an anode of tantalum powder provided in the form of a pressed body, wherein the tantalum body is characterized as having been heated to a sintering temperature of about 1,550° C. to about 1,650° C. for up to about 8 minutes;
   b) a cathode;
   c) a separator segregating the anode from the cathode; and
   d) a working electrolyte.

5. The capacitor of claim 4 wherein the tantalum is characterized as having been heated to the sintering temperature of about 1,590° C. to about 1,640° C. for up to about 6 minutes.

6. The capacitor of claim 4 wherein the tantalum is of either a beam melt or a sodium reduced type.

7. The capacitor of claim 4 of either an electrolytic or an electrochemical/electrolytic hybrid type.

8. A method for providing an anode for a capacitor, the method comprising the steps of:
   a) pressing a tantalum powder into the form of a pressed body; and
   b) heating the pressed tantalum powder at a sintering temperature of about 1,550° C. to about 1,650° C. for up to about 8 minutes to thereby provide a sintered valve metal body.

9. The method of claim 8 including heating the tantalum to the sintering temperature of about 1,590° C. to about 1,640° C. for up to about 6 minutes.

10. The method of claim 8 including heating the tantalum to the sintering temperature in a vacuum ranging from about $10^{-4}$ to about $10^{-6}$ Torr.

11. The method of claim 8 including providing the tantalum being of either a beam melt or a sodium reduced type.

12. The method of claim 8 including providing the capacitor as either an electrolytic or an electrochemical/electrolytic type.

13. A capacitor, which comprises:
   a) an anode of either a beam melt or a sodium reduced type of tantalum powder provided in the form of a pressed body, wherein the tantalum body is characterized as having been heated to a sintering temperature for about 10 minutes, or less;
   b) a cathode;
   c) a separator segregating the anode from the cathode; and
   d) a working electrolyte.

* * * * *